F. W. STARR.
METHOD OF DERINDING ORANGES AND PRODUCT THEREOF.
APPLICATION FILED JUNE 7, 1916.
1,277,148.
Patented Aug. 27, 1918.
2 SHEETS—SHEET 1.
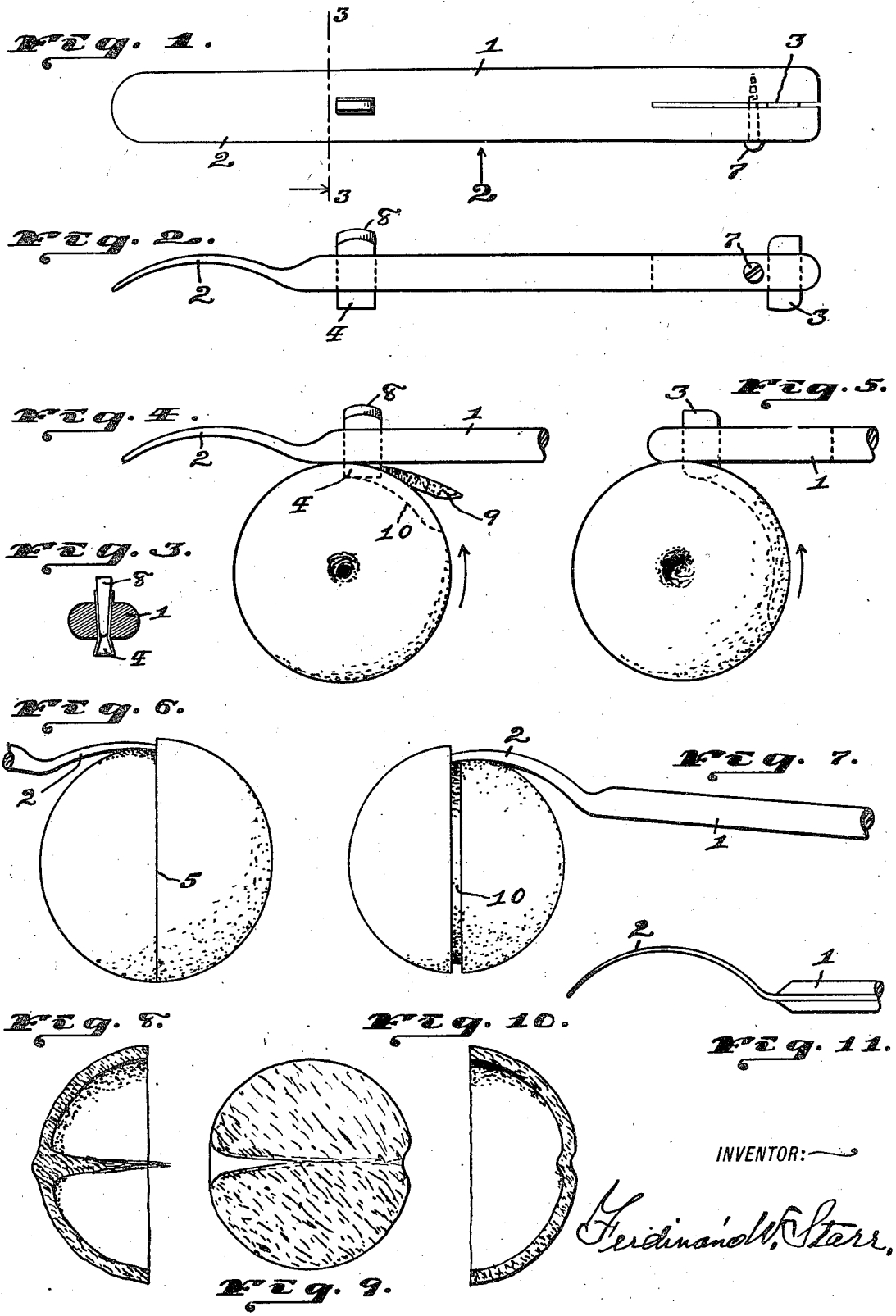
INVENTOR:—
Ferdinand W. Starr.

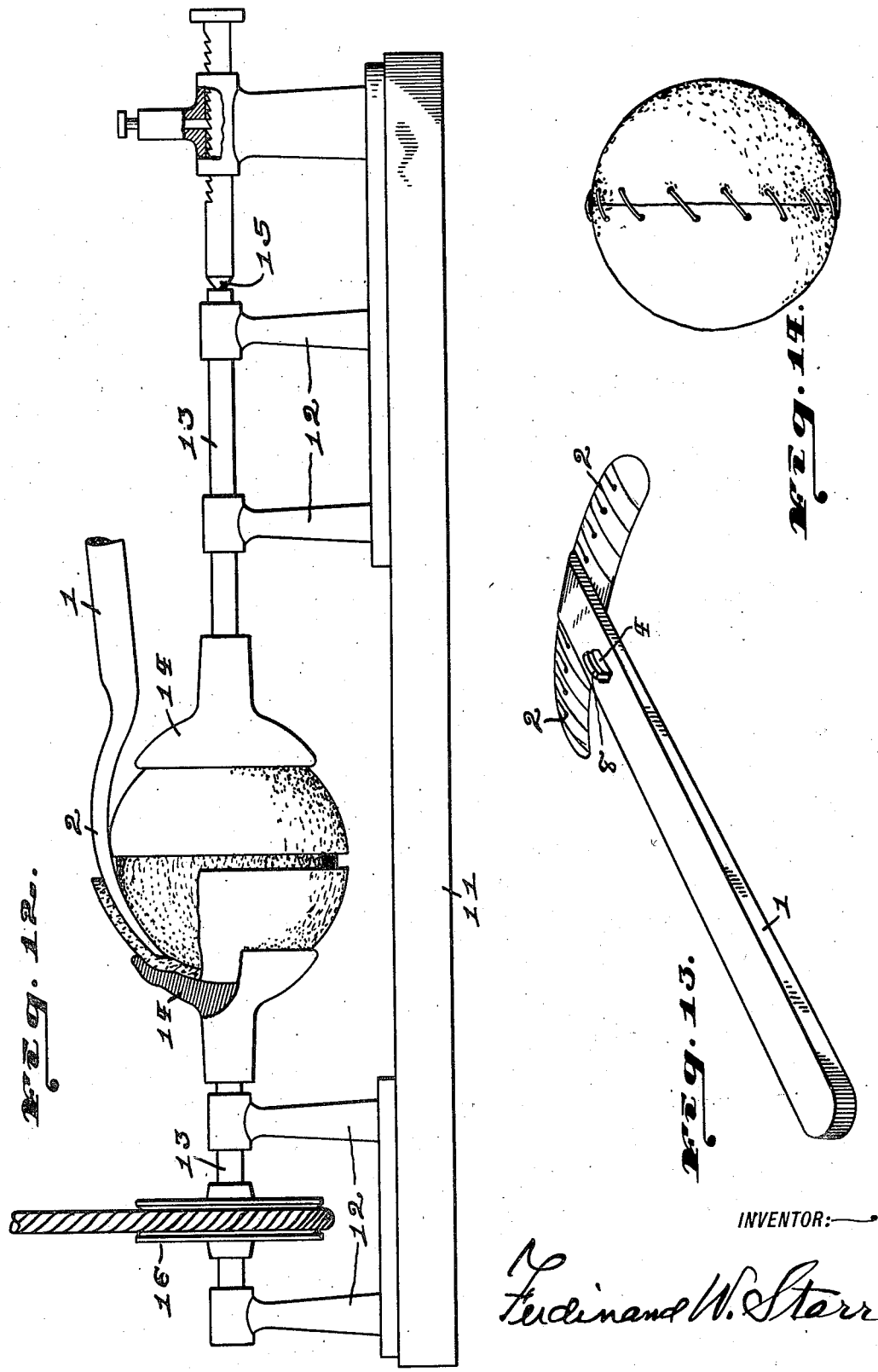

UNITED STATES PATENT OFFICE.

FERDINAND W. STARR, OF OKLAHOMA, OKLAHOMA.

METHOD OF DERINDING ORANGES AND PRODUCT THEREOF.

1,277,148.   Specification of Letters Patent.   Patented Aug. 27, 1918.

Application filed June 7, 1916. Serial No. 102,339.

*To all whom it may concern:*

Be it known that I, FERDINAND W. STARR, a citizen of the United States, residing in Oklahoma, in the county of Oklahoma and State of Oklahoma, have invented certain new and useful Improvements in Methods of Derinding Oranges and Products Thereof, together with certain other novel and useful features connected with and arising out of the invention, of which the following is a specification, and the leading novel and useful features thereof claimed at the close of same.

Referring to the accompanying drawings, Figure 1 is a plan view of my derinding device.

Fig. 2 is a side elevation in the direction of the arrow 2 of Fig. 1.

Fig. 3 is a sectional view taken on line 3—3 of Fig. 1.

Fig. 4 is a view in the same directions as Fig. 2, showing a fragment of the device and an orange on which it is being used.

Fig. 5 is a similar view but showing a different manner of using device.

Fig. 6 is a similar view showing manner of separating the rind from the flesh of the orange after a median circumferential incision through the rind of orange has been made.

Fig. 7 is a similar view showing a circumferential cut-out instead of the plain incision shown in Fig. 6.

Fig. 8 is a sectional view of the semispherical portion of the rind removed.

Fig. 9 is a sectional view of the fleshy body of the orange from which the rind has been removed according to my invention.

Fig. 10 is a sectional view of the opposite semispherical portion of the rind removed according to my invention.

Fig. 11 is a partial side view showing an optional construction of a tool with a flexible derinding end.

Fig. 12, Sheet 2, is a sectional view of a machine for derinding oranges in accordance with my invention.

Fig. 13 is a perspective view of a tool having oppositely disposed derinding ends especially designed for use on a power driven machine.

Fig. 14 shows an orange derinded according to my invention, and the meeting edges of the rind stitched together with twine.

Similar numerals of reference designate like parts throughout all the figures of the drawings, in which numeral 1 denotes the derinding tool having a smooth, non-cutting, curved, penetrating end 2, which is especially designed and adapted to be readily and easily worked down between the rind and flesh of the orange without fracturing the rind or bruising the flesh thereof, as may be inferred from Figs. 8, 9 and 10, representing actual practical results of the invention, in which even the root of the stem, and navel of the orange have been pulled or lifted out so nicely, that, if desired, the separated parts may be set together again for safe-keeping and later use, a novel feature of the invention hereinafter more fully described.

Fig. 11 shows a tool with quite a flexible derinding end, which in practice will yield to the contour of the orange as it is forced between the rind and flesh of same. The tool is preferably provided with a cutting blade 3 or a router 4, which may be attached near the front or at the rear of the tool as shown, and either of which is employed for making a preferred preliminary circumferential incision 5 or cut-out 10. The cutting blade and the router both being adjustable to the thickness of the rind on different kinds of oranges, so that the blade or router cannot cut into the flesh of same. It is best to bevel-sharpen the router from its outside only so that it will have no tendency to cut into the flesh of the orange, however close it may pass over the same. These cutters may be held in the desired adjustment by a screw 7 or a wedge 8, as shown in Figs. 2, 4 and 3. The router 4 shown in Fig. 3, makes an under-cut, which somewhat facilitates the insertion of the derinding tool. A router, of whatsoever shape preferred, should have sufficient clearance to permit the ready passage of the strip 9 as it is circumferentially removed from the orange, producing and leaving the circumferential groove or cut-out 10, ready for the insertion of the derinding end 2 of the tool, whether the orange be held by hand or in a machine as hereinafter shown and described. It has been found in practice that the preliminary incision 5 or 10 is preferably made substantially midway between the stem and navel of the orange, from which point the derinding tool is most easily inserted and semispherically worked down to the stem and navel of the orange without fracturing the rind or bruising the flesh thereof, thus producing nice useful cups, available in artistic cookery and service, and, also producing practically perfect cups for replacement on the derinded body of the orange, for safe-keeping and later use of same, a feature which is an important novel and useful outcome of the invention, and will no doubt be largely utilized under various circumstances, as for instance in supplying passengers on trains with oranges so derinded or prepared, thereby eliminating the unsanitary manner of removing the rind with the fingers as frequently noticed on trains, and elsewhere, so likewise in taking oranges to picnics. This feature of the invention has been merely mentioned to convey somewhat the possible useful and sanitary applications of the invention without entering into other useful applications of same.

Fig. 14 represents an orange derinded by my improved tool and method, the meeting edges of the rind being circumferentially stitched together with wrapping cord, in which condition the orange may be kept fresh and clean for days and quickly opened when wanted for use, without the usual mussing or distorting of the flesh and rind of the orange. It should be mentioned that by this method of derinding oranges, the flesh of the orange need not at all be touched by hand as the tool may be inserted down to the stem and navel of the orange without removing the rind as shown in Figs. 8, 9, and 10, and then wrapped in paper, stitched, or otherwise laid away for subsequent sale or use.

Fig. 12 shows merely an embodiment of a machine for derinding oranges, of which there may be endless modifications without departing from the spirit of my invention, in which 11 is the base, 12 the shaft supports, 13 the rotatable shafts having elastic rubber chucks 14, in which the orange is held as shown, by impinging the pivot point against the longitudinally movable shaft 13 as shown. The ratchet and pawl shown serving to hold the rubber chucks in sufficient frictional contact with the orange to permit its derinding, for which I may use any of the tools shown on sheet one of the drawing, but prefer the tool shown in Fig. 13, which can be inserted under the rind to the right and to the left without reversing the same and therefore, greatly facilitates the derinding of the orange on a power driven machine.

The elastic chucks 14 will yield to the pressure of the tool as it is passed under the rind down to the stem or navel of the orange, that feature being shown somewhat exaggerated, as in practice the yieldability of the chuck is not so great, the advantages of a yieldable chuck in a machine of this character will no doubt be evident without further description of same, and the advantage of the pivot-bearing 15 in a machine of this character and for the purpose described, will also be evident so long as no additional driving means is connected with the shaft 13 located to the right of the chucked orange. It will perhaps be evident from the large drive-pulley 16 that the speed of the rotation of the orange must be comparatively slow to get the best results. Fast motion as in wood turning would thwart the purpose of the machine for such derinding, as practical experience has demonstrated. The tool shown, in Fig. 13 may be provided in opposite directions with equidistant lines or graduations as shown, so that in placing the same for said median circumferential incision they will indicate the centrality of the tool over any size orange and of course be quite an advantage in utilizing such a tool for that purpose.

Having now briefly described the character and purpose of my invention, what I claim and desire to secure by Letters Patent is—

1. As a new commercial product in derinded oranges consisting of a derinded body, and semispherical rind cups surrounding the same and connected at the navel and stem portions thereof, said cups being spaced apart and having vertically disposed parallel extending severed edges.

2. A new commercial product in derinded oranges, comprising semispherical rind cups separated from the body of the orange and from each other substantially midway between the navel and stem portions thereof.

3. The commercial product in the derinding of oranges, comprising the derinded spherical orange body surrounded by semispherical rind cups separated circumferentially by a groove having vertical parallel arranged sides approximately midway between the navel and stem portions thereof.

4. The method of removing and utilizing orange rinds, consisting in (1) making complete ring removing vertical and parallel extending circumferential incisions of predetermined depth through the rind only approximately midway between the stem and navel portions of the orange and (2) then loosening the rind through and from said circumferential incisions semispherically down under the rind to the stem and navel of the orange producing surrounding semispherical rind cups without removal during the derinding operation.

5. The method which consists in removing semispherical sections of rind from an orange and then replacing the same and fastening together the meeting edges thereof, substantially as described and shown.

Witness my hand this 3rd day of June, 1916.

FERDINAND W. STARR.